United States Patent [19]
Domesle et al.

[11] Patent Number: 5,179,059
[45] Date of Patent: * Jan. 12, 1993

[54] CATALYST FOR PURIFYING THE EXHAUST GASES OF INTERNAL COMBUSTION ENGINES AND METHOD FOR MAKING THE CATALYST

[75] Inventors: Rainer Domesle, Alzenau-Kälberau; Bernd Engler, Hanau; Felix Schmidt, Rheinfelden; Peter Schubert, Grenzach-Wyhlen; Edgar Koberstein, Alzenau, all of Fed. Rep. of Germany

[73] Assignee: Degussa AG, Frankfurt am Main, Fed. Rep. of Germany

[*] Notice: The portion of the term of this patent subsequent to Dec. 17, 2008 has been disclaimed.

[21] Appl. No.: 658,280

[22] Filed: Jan. 31, 1991

[30] Foreign Application Priority Data

Feb. 9, 1990 [DE] Fed. Rep. of Germany ....... 4003939

[51] Int. Cl.[5] .................. B01J 21/04; B01J 21/06; B01J 23/10; B01J 23/89
[52] U.S. Cl. ................................ 502/303; 502/304; 423/213.5
[58] Field of Search ............................. 502/303, 304

[56] References Cited

U.S. PATENT DOCUMENTS

| | | | |
|---|---|---|---|
| 4,294,726 | 10/1981 | Bozon et al. | 252/462 |
| 4,367,162 | 1/1983 | Fujitani et al. | 502/304 X |
| 4,753,915 | 6/1988 | Vogt et al. | 502/304 |

FOREIGN PATENT DOCUMENTS

| | | |
|---|---|---|
| 2430795 | 2/1980 | European Pat. Off. |
| 0100267 | 2/1984 | European Pat. Off. |
| 0326845 | 2/1988 | European Pat. Off. |
| 2907106 | 12/1985 | Fed. Rep. of Germany. |

*Primary Examiner*—W. J. Shine
*Attorney, Agent, or Firm*—Beveridge, DeGrandi & Weilacher

[57] ABSTRACT

A catalyst for purifying the exhaust gases of internal combustion engines with improved light-off behavior and improved durability with reduced specific noble-metal content is disclosed which uses active aluminum oxide provided with customary promoters as carrier and platinum and/or palladium and rhodium in customary amounts as noble metals. In addition, it contains one or more base metals in amounts up to 5 times the mass of the total noble metal which are brought into the immediate vicinity of the rhodium by means of a special manufacturing technique.

24 Claims, No Drawings

CATALYST FOR PURIFYING THE EXHAUST GASES OF INTERNAL COMBUSTION ENGINES AND METHOD FOR MAKING THE CATALYST

INTRODUCTION TO THE INVENTION

The present invention relates generally to a catalyst for purifying the exhaust gases of internal combustion engines by means of oxidation and/or reduction.

As a result of an increased awareness of the need for environmental protection, legislative efforts for setting exhaust-gas limits for pollutants such as carbon monoxide, hydrocarbons and nitrogen oxides from internal combustion engines, especially from motor vehicles, are becoming more and more intense. This has the consequence that the so-called cold-start phase of engine operation has become quite significant in the test cycles specified in the US, Japan and Europe. Accordingly, there is a need for emission control catalysts which can convert the pollutants to a high degree into harmless components at exhaust-gas temperatures which are as low as possible. Since engine design development is exhibiting at the same time a trend toward concepts which increasingly utilize operating phases with an excess of oxygen (lean exhaust gas), more stringent requirements also apply for the long-term behavior of catalysts. Moreover, there is also a need to reduce the amount of noble metal used per catalyst for reasons of economy but also for reasons of the availability of platinum-group metals. However, losses of activity and durability can occur as a result of these activities which are unacceptable.

SUMMARY OF THE INVENTION

The present invention relates in particular to a catalyst, for purifying the exhaust gases of internal combustion engines, where aluminum oxide of the transition series is a carrier which includes as promoter substances 3–70 % by weight $CeO_2$, 0–20 % by weight $La_2O_3$, optionally as a mixture with other rare-earth metal oxides, and 1–20 % by weight $ZrO_2$, 0–10 % by weight $Fe_2O_3$, and 0–20 % by weight NiO as promoter. A catalytically active phase is applied to the carrier. The catalytically active phase contains noble metal and comprises 0.02–3 % by weight platinum and/or palladium and rhodium, with a weight ratio between platinum and/or palladium and the rhodium of 1:2 to 15:1, preferably 1:1 to 3:1; optionally, with a weight ratio between platinum and palladium of 10:1 to 1:5. The optionally lattice-stabilized carrier is impregnated with a solution of a promoter compound and/or coated by means of mixing the same with a suspension of oxides, hydroxides or carbonates of the particular promoter element. The carrier is subsequently treated in air at 300°–900° C., and then impregnated with a solution of compounds of the noble metals. After drying, the product obtained thereby is activated, optionally in a hydrogen-containing gas, or optionally under hydrothermal conditions, at a temperature in a range of 250°–1050° C. The catalyst in the form of a coating on an inert ceramic or metal carrier is present in an amount of 5–30 % by weight relative to the weight of the inert carrier.

The invention is based on catalytic compounds described in DE-PS 29 07 106 (U.S. Pat. No. 4,294,726) and expands and modifies them in an advantageous manner.

An object of the invention is to solve the problem of meeting the above-mentioned requirements by means of improving the known catalysts as regards the light-off behavior, the lean aging durability and a lowering of the specific noble-metal content.

In addition to the catalysts of the composition in accordance with the present invention, another object is to provide a method for their production.

DETAILED DESCRIPTION OF THE INVENTION

An object of the present invention is to provide a catalyst for purifying the exhaust gases of internal combustion engines which has aluminum oxide of the transition series as a carrier and which further contains 3–70 % by weight $CeO_2$, 0–20 % by weight $La_2O_3$, optionally as a mixture with other rare-earth metal oxides, and 1–20 % by weight $ZrO_2$, 0–10 % by weight $Fe_2O_3$, and 0–20 % by weight NiO as promoter for the catalytic reaction, and further with a catalytically active, noble metal containing phase applied to the carrier. The catalytically active phase comprises 0.02–3 % by weight of a noble metal; i.e. platinum and/or palladium and rhodium, with a weight ratio between platinum and/or palladium and the rhodium of 1:2 to 15:1, preferably 1:1 to 3:1; optionally, with a weight ratio between platinum and palladium of 10:1 to 1:5. The carrier can be optionally lattice-stabilized as is known in the art.

According to the method aspect of the invention, the carrier is impregnated with a solution of a promoter compound and/or the carrier is coated by means of mixing with a suspension of oxides, hydroxides or carbonates of the particular promoter elements. Subsequently the carrier is treated in air at 300°–900° C., and then the carrier is impregnated with a solution of one or more compounds of the noble metals, as the catalytically active component. After drying, the catalyst is activated by heating at a temperature in a range of 250°–1050° C., optionally in a hydrogen-containing gas, optionally under hydrothermal conditions.

The catalyst can also be present in the form of a coating on an inert support comprising ceramics or metal, as for example a honeycomb, in an amount of 5–30% by weight relative to the weight of the inert support.

The percentage amounts of $CeO_2$ in the catalyst, when formed carriers of active $Al_2O_3$ such as pellets are used, are 3 to approximately 20% by weight, preferably 4 to 10 % by weight. In the case of honeycomb support catalysts, the catalyst applied by means of dispersion coating onto the inert honeycomb support contains at least 15 % by weight of $CeO_2$.

"Aluminum oxide of the transition series" is a well known term as shown in Kirk Othmer, Encyclopedia of Chemical Technology, 3rd Edition, volume 2, pages 218–244.

The catalyst of the present invention is characterized in that it contains at least one base metal selected from the series of lithium, potassium, rubidium, magnesium, calcium, barium, lanthanum, cerium, praseodymium, neodymium, samarium, iron, cobalt and nickel in an amount of up to 5 times the total mass of the noble metal. The catalyst can be obtained by means of impregnating the promoter-containing carrier with a solution (A) of compounds of platinum and/or of palladium in an amount corresponding to at least 30 % of the total mass of platinum and/or palladium, drying and activating as described. This step is followed by impregnating in a second step with a solution (B) which contains the compound of rhodium, and optionally the residual amount of platinum and/or palladium compound, that was not added in the first step with solution (A). Then there follows a renewed drying and activating. Solution (B) contains one or more of the above mentioned base-metal compounds.

An essential feature of the new catalyst in accordance with the present invention is the use at the same time of certain base metals in the immediate vicinity of rhodium. In other respects, the basic composition of the catalyst generally corresponds to known formulations with the platinum-group metal rhodium, as well as platinum and/or palladium, applied onto a carrier of aluminum oxide of the transition series which is provided with oxidic phases of oxygen-storing and/or carrier-stabilizing additives, so-called promoters.

Both the elements of the platinum group and of the promoters are used in certain amounts which are essentially within known limits, even though these amounts are set forth in a more precise manner for the purpose of the present invention.

The placing of the base metals Li, K, rubidium, Mg, Ca, Ba, La, Ce, Pr, Nd, Sm, Fe, Co and/or Ni in the immediate vicinity of rhodium, which placing is essential for the invention, is associated with a special method of production described herein as an aspect of the invention. In this method the promoter-containing aluminum oxide carrier is first impregnated with a solution of Pt and/or Pd compounds and then dried and activated, optionally in a gas containing $H_2$ and optionally under hydrothermal conditions, that is, e.g. steaming in an atmosphere containing water vapor. There, the carrier is impregnated with a second solution containing the rhodium and the specified base metals and is thereafter activated. At least 30 % of the total mass of Pt and/or Pd is provided in the first solution (A) so that a large part of these elements remains removed from the vicinity of the specified base metals.

The specified base metals added in accordance with the method of the present invention can thus enter in an intensified manner into a reciprocal action with the rhodium, which brings about the reduction effect of the catalyst.

A quantitative separation of the local spheres of rhodium and Pt and/or Pd does not have to be present in the catalyst of this invention. It is much more essential that the two species of noble metal are primarily not present in an alloyed state or in a state in which they are interlocked with one another. This condition is achieved by the method of production in accordance with the present invention.

The catalyst of the invention can be in the form of a carrier catalyst, e.g. in spherical form or in some other form as bulk material. However, it can also be present as a coating on an inert, structure-reinforcing support of ceramics or metal. Such inert support can be the well known honeycombs of cordierite, mullite, α-aluminum oxide or of a ferritic steel alloy. Compact form bodies of the specified materials can also be used.

An advantageous embodiment of the catalyst will now be described that applies in the case of honeycomb catalysts as well as bulk-material shell catalysts with an inert carrier core. In this embodiment, 30-100 % of the total mass of the aluminum oxide carrier containing the promoters is deposited before the application of solution (A) and 0-70 % of this total mass of carrier is deposited before the application of solution (B) as the coating. As a result of the partial deposition of the carrier, the promoters in the deposited portions of the carrier exhibit differing concentrations and the carrier portion deposited before the application of solution (B) preferably exhibits lower concentrations of the promoters within the framework of the given concentration ranges than does the residual mass of the carrier.

A further variation of the catalyst of the invention has also proven to be advantageous in which the promoter $CeO_2$ is added in the form of a water-soluble compound into the carrier mass present before the application of solution (A). In the embodiment the specified promoter is added into the carrier mass present before the application of solution (B) by means of mixing it with a suspension of oxides, hydroxides or carbonates of cerium as well as by means of a subsequent decomposition.

The following advantages are achieved with the invention:

1. Lower cold start temperatures for all three pollutant components, to wit, carbon monoxide, hydrocarbons and nitrogen oxides;
2. Increased degrees of conversion for all three pollutant components, to wit, carbon monoxide, hydrocarbons and nitrogen oxides;
3. A better durability.

The given increase in performance when the catalysts of the invention are used also creates the possibility of reducing the noble-metal content, especially the platinum content, per liter of catalytic volume without any significant loss of activity.

The invention is explained further in the following using examples of embodiments.

EXAMPLES

Comparative example 1

A honeycomb body of cordierite with 62 cells/cm$^2$ was loaded with 180 g/l catalytic volume of an oxide mixture. An aqueous suspension with a solid content of 48 % by weight and the following composition was used to this end for the oxide mixture present after activation:

- 70.3 parts by weight γ-aluminum oxide
- 15.0 parts by weight cerium oxide as ammonium cerium (IV) nitrate
- 4.2 parts by weight zirconium oxide as zirconyl acetate
- 8.0 parts by weight nickel oxide
- 2.5 parts by weight iron oxide.

After the honeycomb body had been coated with the oxide layer, it was dried at 120° C., and activated 2 hours at 400° C. Then the honeycomb body coated in this manner was immersed into an aqueous solution of hexachloroplatinic acid, palladium (II) chloride, and rhodium (III) chloride in a weight ratio of Pt:Pd:Rh of 6:4:1 and dried. After a two-hour tempering at 350° C. in air, the reduction of the noble-metal salts deposited on the carrier material finally took place in a current of hydrogen at a temperature of 450° C. for a period of 4 hours. The total noble-metal content was 1.77 g/l carrier volume after this treatment.

EXAMPLE 1

A ceramic honeycomb reinforcer body (62 cells/cm$^2$) was coated with the same oxide layer and in the same manner as described in comparative example 1, dried and activated. Then, the reinforcer coated in this manner was first immersed into an aqueous solution (A) containing hexachloroplatinic acid and palladium (II)

chloride, dried and activated 2 hours at 350° C. in air. The amount of platinum applied was 100 % by weight, of palladium 35 % by weight, relative to the total amount of the particular noble metal in the finished catalyst. The residual amount of the palladium as well as the rhodium were fixed to the carrier by means of a second impregnation step with a solution (B), which contained the base metal lithium in the form of lithium chloride in addition to the noble-metal salts palladium chloride and rhodium chloride, dried and activated. The structure was then reduced 4 hours at 450° C. in a current of hydrogen. The total noble-metal content of the finished catalyst was 1.77 g/l carrier volume. The weight ratio between the noble metals Pt:Pd:Rh was 6:4:1. The doping amount of lithium was 2.5 times the total amount of noble metal.

EXAMPLE 2

The preparation of this catalyst took place in the same way as in example 1. However, the base metal additionally added here by means of noble-metal impregnation solution (B) was samarium (samarium (III) acetate). The doping amount of samarium was 0.5 times the total mass of noble metal.

EXAMPLE 3

The preparation of this catalyst took place in the same way as in example 1. However, the base metal additionally added here by means of noble-metal impregnation solution (B) was cobalt (cobalt nitrate). This doping amount of cobalt was 2 times the total mass of noble metal.

EXAMPLE 4

The preparation of this catalyst took place in the same way as in example 1. However, the base metal additionally added here by means of noble-metal impregnation solution (B) was cerium (cerium (III) acetate). This doping amount of cerium was 4 times the total mass of noble metal.

Comparative example 2

A honeycombed ceramic monolith (62 cells/cm²) was coated with a total of 160 g/l carrier volume of an oxide mixture. To this end, an aqueous suspension with a solid content of 51 % by weight and the following composition was used for the oxide mixture present after activation:
 59 parts by weight γ-aluminum oxide
 30 parts by weight cerium oxide (cerium (III)
 3 parts by weight zirconium oxide (zirconyl nitrate)
 8 parts by weight lanthanum oxide (lanthanum (III) nitrate)

After the coating of the carrier body with the oxide layer, it was dried at 130° C. and activated 2 hours at 650° C. Then, the honeycomb body coated in this manner was immersed into a solution of hexachloroplatinic acid and rhodium nitrate in a weight ratio of Pt:Rh of 2.5:1, dried and activated 2 hours at 600° C. in air. The total noble-metal content was 0.88 g/l carrier volume after this treatment.

EXAMPLE 5

A ceramic honeycomb reinforcer body (62 cells/cm²) was coated with the same oxide layer and essentially in the same manner as described in comparative example 2. In contrast to comparative example 2, however, the honeycomb reinforcer was coated at first with only ⅔ of the total amount of the oxide layer. The honeycomb body coated in this manner was then immersed into an aqueous solution (A) containing hexachloroplatinic acid, dried and activated 2 hours at 600° C. in air. Thereafter, the last third of the total amount of the oxide layer was applied in the manner already described, dried and activated before the reinforcer loaded in this manner was immersed into an aqueous solution (B) containing rhodium chloride and nickel acetate, dried and activated 2 hours at 600° C. The total noble-metal content of the finished catalyst was 0.88 g/l carrier volume. The weight ratio of Pt:Rh was 2.5:1. The doping amount of nickel was twice the total mass of noble metal.

EXAMPLE 6

The preparation of this catalyst took place in the same manner as in example 5 with the difference that the base metal additionally added here by means of noble-metal impregnation solution (B) was barium (barium nitrate). This doping amount of barium was 3 times the total amount of noble metal.

EXAMPLE 7

The coating of the ceramic honeycomb body took place with the same oxide layer and essentially in the same manner as described in comparative example 2. In contrast to comparative example 2, however, the honeycomb reinforcer was coated at first with only ⅓ of the total amount of the oxide layer. The honeycomb coated in this manner was then immersed into an aqueous solution (A) containing hexachloroplatinic acid, dried and activated 2 hours at 600° C. in air. Thereafter, the remaining two thirds of the total amount of the oxide layer was applied in the manner already described, dried and activated 2 hours at 600° C. before the reinforcer charged in this manner was immersed into an aqueous solution (B) containing rhodium nitrate and lanthanum nitrate, dried and activated 2 hours at 600° C. The total noble-metal content of the finished catalyst was 0.88 g/l carrier volume. The weight ratio of Pt:Rh was 2.5:1. The doping amount of lanthanum was 1.5 times the total mass of noble metal.

EXAMPLE 8

A ceramic honeycomb body with 62 cells/cm² was coated with the same oxide layer and essentially in the same manner as described in comparative example 2. In contrast to comparative example 2, however, the honeycomb reinforcer was coated at first with only one half of the total amount of the oxide layer. The honeycomb body coated in this manner was then immersed into an aqueous solution (A) containing hexachloroplatinic acid, dried and activated 2 hours at 600° C. in air. Thereafter, the second half of the total amount of the oxide layer was applied in the manner described, dried and activated before the reinforcer loaded in this manner was immersed into an aqueous solution (B) containing rhodium nitrate and barium nitrate, dried and activated 2 hours at 600° C. The total noble-metal content of the finished catalyst was 0.88 g/l carrier volume. The weight ratio of Pt:Rh was 2.5:1. The doping amount of barium corresponded to the total amount of noble metal.

EXAMPLE 9

The preparation of this catalyst took place in the same way as in comparative example 2 with the difference that after the application of the oxide layer, the honeycomb body loaded in this manner was first immersed into an aqueous solution (A) containing hexachloroplatinic acid, dried and activated 2 hours at 600° C. in air. The rhodium was fixed on the carrier by means of a second impregnation step with a solution (B), which contained the base metal iron in the form of iron (III) chloride in addition to rhodium nitrate, dried and activated 2 hours at 600° C.

The total noble-metal content of the finished catalyst was 0.88 g/l carrier volume. The weight ratio of Pt:Rh was 2.5:1. The doping amount of iron was twice that of the total mass of noble metal.

EXAMPLE 10

The preparation of this catalyst took place in the same manner as in example 9. However, the doping amount of iron additionally added with noble-metal impregnation solution (B) was five times that of the total mass of noble metal.

COMPARATIVE EXAMPLE 3 reinforcer of cordierite with 62 cells/cm$^2$ was coated with 130 g/l carrier volume of an oxide mixture. To this end, an aqueous suspension with a solid content of 58 % by weight and the following composition was used for the oxide mixture present after activation:
- 31 parts by weight $\gamma$-aluminum oxide
- 65 parts by weight cerium oxide
- 2 parts by weight zirconium oxide (zirconyl nitrate)
- 2 parts by weight nickel oxide (nickel (II) acetate)

After the coating of the carrier body with the oxide layer, it was dried at 150° C. and activated 3 hours at 500° C. Then, the reinforcer coated in this manner was immersed into an aqueous solution of tetraamine platinum (II) hydroxide, palladium (II) chloride and rhodium (III) chloride in a weight ratio of Pt:Pd:Rh of 2:1:1 and dried. Finally, after a one hour tempering at 500° C. in air, the reduction of the noble-metal salts separated on the carrier material took place in a current of hydrogen containing water vapor ($H_2O:H_2 = 1:3$) at a temperature of 550° C. for a period of 3 hours. The total noble-metal content was 0.64 g/l carrier volume after this treatment.

EXAMPLE 11

A ceramic honeycomb body (62 cells/cm$^2$) was coated with the same oxide layer and in the same manner as described in comparative example 1, dried and activated. The reinforcer coated in this manner was then first immersed into an aqueous solution (A) containing tetraamine platinum (II) hydroxide and palladium (II) chloride, dried and activated 1 hour at 500° C. The amount of platinum applied therewith was 100 % by weight, the amount of palladium 60 % by weight relative to the total amount of the particular noble metal on the finished catalyst. The residual amount of the palladium as well as the rhodium were fixed to the carrier by means of a second impregnation step with a solution (B), which contained the base metals calcium and praseodymium (mass ratio Ca:Pr=2:1) in the form of their nitrates in addition to the noble-metal salts palladium chloride and rhodium chloride, dried and activated. The structure was then reduced 3 hours at 550° C. in a current of hydrogen containing water vapor ($H_2O:H_2 = 1:3$). The total noble-metal content of the finished catalyst was 0.64 g/l carrier volume. The total amount of the doping elements calcium and praseodymium was four times the total mass of noble metal.

EXAMPLE 12

The preparation of this catalyst took place in the same manner as in example 11 with the difference that 90 % by weight of the platinum and 80 % by weight of the palladium were fixed on the carrier with noble-metal impregnation solution (A) and 100 % by weight of the rhodium, 10 % by weight of the platinum and 20 % by weight of the palladium, together with the base metals potassium (as chloride), barium (as nitrate) and iron (as nitrate) in a mass ratio of K:Ba:Fe = 1:3:1, were fixed on the carrier with noble-metal impregnation solution (B). The total amount of noble metal of the finished catalyst was likewise 0.64 g/l carrier volume, the doping amount of the base metals potassium, barium and iron was, in toto, five times the total mass of noble metal.

COMPARATIVE EXAMPLE 4

A honeycomb ceramic reinforcer with 62 cells/cm$^2$ was coated with 145 g/l carrier volume of an oxide mixture. An aqueous suspension with a solid content of 56 % by weight and the following composition was used to this end for the oxide mixture present after activation:
- 56 parts by weight $\gamma$-aluminum oxide
- 31 parts by weight cerium oxide
- 8 parts by weight zirconium oxide
- 5 parts by weight lanthanum oxide (lanthanum (III) acetate)

After the honeycomb body had been coated with the oxide layer, it was dried at 135° C. and activated 1 hour at 350° C. Then, the reinforcer coated in this manner was immersed into an aqueous solution of palladium nitrate and rhodium chloride in a weight ratio of Pd:Rh of 4:1, dried and treated 1 hour at 400° C. in air and a further 3 hours at 400° C. in a current of hydrogen. The total noble-metal content of the finished catalyst was 0.78 g/l carrier volume.

EXAMPLE 13

A honeycomb body of cordierite with 62 cells/cm$^2$ was coated with 145 g/l carrier volume of an oxide mixture whose total composition corresponded to that in comparative example 4. However, in contrast to comparative example 4, 90 g/l carrier volume of an oxide layer were applied at first. An aqueous suspension with a solid content of 54 % by weight and the following composition was used thereby for the oxide mixture present after activation:
- 45.8 parts by weight $\gamma$-aluminum oxide
- 38.9 parts by weight cerium oxide
- 9.6 parts by weight zirconium oxide
- 5.0 parts by weight lanthanum (III) oxide (lanthanum acetate)

After the coating of the carrier body with this first oxide layer, it was dried at 135° C. and activated 1 hour at 350° C. Then, the honeycomb body coated in this manner was immersed into an aqueous solution (A) of palladium nitrate, dried and treated 1 hour at 400° C. in air.

Then, a further 55 g/l carrier volume of a second oxide layer were applied. For this, an aqueous suspension with a solid content of 55 % by weight and the following composition was used for the oxide mixture present after activation:

72.7 parts by weight γ-aluminum oxide
18.2 parts by weight cerium oxide (cerium (III) nitrate)
5.5 parts by weight zirconium oxide (zirconyl acetate)
3.6 parts by weight lanthanum (III) oxide After another drying and activation, the reinforcer coated in this manner was immersed into an aqueous solution (B) containing rhodium (III) chloride, lithium chloride and neodymium (III) nitrate, dried, activated 1 hour at 400° C. in air, and reduced a further 3 hours at 400° C. in a current of hydrogen. The total noble-metal content of the finished catalyst was 0.78 g/l carrier volume. The weight ratio of Pd:Rh was 4:1. The amount of base metals lithium and neodymium was 3.5 times the total mass of noble metal. The mass ratio of Li:Nd was 1:1.

Comparative example 5

A ceramic honeycomb body (62 cells/cm$^2$) was coated with 150 g/l carrier volume of an oxide mixture. An aqueous suspension with a solid content of 68 % by weight and the following composition was used to this end for the oxide mixture present after activation:
49 parts by weight γ-aluminum oxide
41 parts by weight cerium oxide (cerium (III) oxalate nonahydrate)
10 parts by weight zirconium oxide (zirconyl nitrate)

After the honeycomb body had been coated with the oxide layer, it was dried at 150° C. and activated 3 hours at 350° C. Then, the reinforcer coated in this manner was immersed into an aqueous solution of tetraamine platinum (II) nitrate and rhodium (III) chloride, dried and activated 2 hours at 350° C. The total noble-metal content of the finished catalyst was 0.33 g/l carrier volume. The weight ratio of the noble metals Pt:Rh was 1:1.

EXAMPLE 14

A ceramic reinforcer was coated with the same oxide layer and in the same manner as described in comparative example 5, dried and activated. The honeycomb body coated in this manner was then first immersed into an aqueous solution (A) containing tetraamine platinum (II) nitrate, dried and activated 2 hours at 350° C. The amount of platinum applied therewith was 95 % by weight relative to the total amount of platinum on the finished catalyst. The residual amount of the platinum as well as the rhodium were fixed to the carrier by means of a second impregnation step with a solution (B), which contained the base metal rubidium (rubidium nitrate) in addition to the noble-metal salts hexachloroplatinic acid and rhodium (III) nitrate, dried and activated. The total noble-metal content of the finished catalyst was 0.33 g/l carrier volume. The weight ratio of Pt:Rh was 1:1. The doping amount of rubidium was 3 times the total amount of noble metal.

Comparative example 6

A honeycomb body of cordierite with 62 cells/cm$^2$ was coated with 169 g/l carrier volume of an oxide mixture. An aqueous suspension with a solid content of 62 % by weight and the following composition was used to this end for the oxide mixture present after activation:
67.5 parts by weight γ-aluminum oxide
28.5 parts by weight cerium oxide (cerium (III) acetate)
2.6 parts by weight zirconium oxide (zirconyl acetate)
1.4 parts by weight iron (III) oxide The reinforcer coated with the oxide layer was dried at 135° C. and activated 4 hours at 300° C. Then, the honeycomb body coated in this manner was immersed into an aqueous solution of platinum nitrate and rhodium chloride and dried. After a two-hour tempering at 400° C. in air, the reduction of the noble-metal salts separated on the carrier material finally took place in a current of hydrogen and nitrogen containing water vapor (volumetric ratio of $N_2:H_2: H_2O=87:3:10$) at a temperature of 880° C. for 2.5 hours. The total noble-metal content after this treatment was 1.06 g/l carrier volume. The weight ratio of Pt:Rh was 3:1.

EXAMPLE 15

A ceramic honeycomb body (62 cells/cm$^2$) was coated with the same oxide layer and in the same manner as described in comparative example 6, dried and activated. The reinforcer coated in this manner was then first immersed into an aqueous solution (A) containing platinum nitrate, dried and activated 2 hours at 400° C. The amount of platinum applied therewith was 80 % by weight of the total amount of platinum on the finished catalyst. The residual amount of the palladium and of the rhodium was fixed to the carrier in a second impregnation step with a solution (B), which contained the base metal magnesium in the form of magnesium chloride in addition to the noble-metal salts hexachloroplatinic (IV) acid and rhodium (III) chloride, dried and activated. The structure was then reduced 2.5 hours at 880° C. in a current of nitrogen and hydrogen containing water vapor (volumetric ratio of $N_2:H_2:H_2O =87:3:10$). The total noble-metal content of the finished catalyst was 1.06 g/l carrier volume. The weight ratio of the noble metals Pt:Rh was 3:1. The doping amount of magnesium was 1.5 times the total amount of noble metal.

EXAMPLE 16

The preparation of this catalyst took place in the same manner as in example 15 with the difference that the base metals nickel and barium were additionally added in a weight ratio of Ni:Ba of 1:1 as nickel nitrate and barium nitrate instead of magnesium by means of noble-metal impregnation solution (B).

This doping amount of base metal was 3.5 times the total mass of noble metal.

Comparative example 7

A spherical catalyst of Al$_2$O$_3$ with particle diameters between 2 and 4 mm, a bulk density of 568 kg/m$^3$, an average crush strength of 52 N and a specific surface area of 102 m$^2$/g is impregnated with an aqueous solution of cerium acetate and zirconyl acetate, dried and tempered 1 hour at 550° C. The catalytic precursor is subsequently coated with a solution of H$_2$PtCl$_6$, PdCl$_2$ and RhCl$_3$, dried and activated 30 min. at 500° C. in air. The finished catalyst contains 30 kg CeO$_2$, 3 kg ZrO$_2$, 570 g Pt, 228 g Pd and 71 g Rh per m$^3$ volume.

Example 17

The catalyst precursor according to comparative example 7 is first impregnated with a solution of H$_2$PtCl$_6$ and PdCl$_2$ containing Pd and one half of the entire platinum, dried and calcined 30 min. at 850° C. Then, RhCl$_3$ and the residual amount of H$_2$PtCl$_6$ is applied together with barium nitrate, dried and activated 30 min. at 550° C. The doping amount of barium was 3 times the total amount of noble metal, which was selected in accordance with comparative example 7.

EXAMPLE 18

The catalytic precursor according to comparative example 7 is first impregnated with $H_2PtCl_6$, dried and calcined 1 hour at 500° C. Then, the intermediate stage obtained is coated with a solution of $RhCl_3$, $PdCl_2$ and calcium nitrate, dried and activated 2 hours at 550° C. in forming gas ($N_2$:$H_2$=95:5). The amount of calcium corresponded to twice the amount of the total mass of noble metal, which was selected in accordance with comparative example 7.

Testing of the catalysts

The testing of the previously described catalysts as regards their qualities in the simultaneous conversion of the exhaust-gas pollutants carbon monoxide (CO), hydrocarbons (HC) and nitrogen oxides ($NO_x$) took place largely in a testing system which operates with a synthetic gas mixture corresponding to that of an internal combustion engine. The dimensions of the test catalysts were cylindrical with the dimensions diameter × height=1"×3". The space velocity was 50,000 $h^{-1}$. Propane was used by way of example as hydrocarbon component. A part of the catalytic specimens was tested on an engine test stand.

The testing took place using freshly prepared catalysts and using specimens which had been previously aged 24 hours in air at 950° C. in an oven. Experience has shown that this treatment (oven ageing) simulates rather well the rigorous requirements placed on the catalyst in a vehicle during rather long running periods under largely lean operation of the engine. A comparison of the results of the fresh and of the aged catalysts describes their durability.

Testing of the cold-start behavior of the catalysts with synthetic exhaust gas

In order to describe the light-off behavior of the catalysts, the temperature of the exhaust gas was driven up linearly from 75° C. to 450° C. at a heating rate of 15° C./min. The exhaust-gas temperature was recorded thereby in comparison to the conversion of the pollutants CO, HC., NO. The temperatures at which a degree of conversion of 50 % is achieved is designated in short with the index 50 and functions as a measure of the starting ability of the catalyst in regard to the particular pollutant conversion. The lower these starting temperatures are, the more effective the catalyst is.

The light-off behavior of the specimens was tested both with a rich (lambda=0.98) and with a lean (lambda=1.01) mixture of exhaust gas. The composition of the synthetic exhaust gas in the light-off test is shown in table 1. The gas mixture for the simulation of a rich exhaust gas (lambda=0.98) differed from the composition of a lean exhaust gas solely in that the oxygen component was selected to be correspondingly smaller and the nitrogen component correspondingly larger.

TABLE 1

Composition of the synthetic exhaust gas for the testing of the light-off behavior of the catalysts

| Exhaust-gas components | air/fuel ratio lambda | |
|---|---|---|
| | lambda = 0.98 (rich) | lambda = 1.01 (lean) |
| $N_2$ | 73.24 | 72.55 |
| $O_2$ | 0.73 | 1.42 |

TABLE 1-continued

Composition of the synthetic exhaust gas for the testing of the light-off behavior of the catalysts

| Exhaust-gas components | air/fuel ratio lambda | |
|---|---|---|
| | lambda = 0.98 (rich) | lambda = 1.01 (lean) |
| $CO_2$ | 14.00 | |
| CO | 1.40 | |
| $H_2$ | 0.47 | |
| $C_3H_8$ | 0.06 | |
| NO | 0.10 | |
| $H_2O$ | 10.00 | |

Testing the conversion behavior of the catalysts with synthetic exhaust gas

In order to test the conversion behavior of the catalysts, the degree of conversion of the pollutants CO, HC and NO was measured as a function of the air/fuel ratio lambda at an exhaust-gas temperature of 400° C. on a synthetic-gas test stand. In order to simulate the dynamic conditions in a vehicle, there was a sweep with a frequency of 0.5 Hz and an amplitude of Δlambda=±0.059 around the average lambda value. The composition of the synthetic exhaust gas is characterized by a basic gas current and a sweep gas current (cf. table 2).

Testing of the light-off behavior on an engine dynamometer

The exhaust gas was generated by a 1.8 l Otto (gasoline internal combustion) engine (90 HP) and brought to the desired exhaust-gas temperature by means of a heat exchanger. The associated equilibrium concentrations were registered. The temperature range from 200° to 450° C. was tested in increments of 10° C. The temperature at which 50% of the particular pollutant is converted was determined by interpolation. The characterization took place for rich and for lean exhaust gas at lambda values of 0.984 and 1.02.

TABLE 2

Composition of the synthetic exhaust gas for testing the dynamic conversion behavior of the catalysts

| (A) Basic gas mixture | |
|---|---|
| Exhaust-gas component | Contents (% by vol.) |
| $CO_2$ | 14.000 |
| CO | 0.140 |
| $H_2$ | 0.047 |
| $C_3H_3$ (propane) | 0.060 |
| NO | 0.100 |
| $H_2O$ | 10.000 |

(B) Additional components of the basic gas mixture for maintaining the air ratio lambda

| Air ratio lambda | Exhaust gas components (% by vol.) | |
|---|---|---|
| | $O_2$ | $N_2$ |
| 0.97 | 0 | 72.293 |
| 0.98 | 0.230 | 72.063 |
| 0.99 | 0.460 | 71.833 |
| 1.00 | 0.690 | 71.603 |
| 1.01 | 0.920 | 71.373 |
| 1.02 | 1.150 | 71.143 |

(C) Sweep pulses with a frequency of 0.5 Hz

| Pulse | Component | Contents (% by vol.) |
|---|---|---|
| lean | $O_2$ | 1.000 |
| | $N_2$ | 2.360 |
| rich | CO | 2.52 |
| | $H_2$ | 0.84 |

Testing of the dynamic conversion behavior on an engine dynamometer

The tests of the dynamic conversion behavior were also carried out with a 1.8 1 Otto engine (90 HP). The exhaust-gas temperature was 400° C. and the composition of the exhaust gas corresponded to a lambda value of 0.965 and 0.995 and 1.008. In order to simulate the dynamic conditions in a vehicle in street traffic, a sweep was made with a frequency of 1.0 hertz and an amplitude of $\Delta\text{lambda} = \pm 0.034$ ($\Delta A/F = \pm 0.5$) around the average lambda value. The associated degree of conversion of the pollutant components CO, HC and $NO_x$ was registered. In tables 3 to 14, the letter V represents the comparative example and the letter B represents the example of the present invention.

TABLE 3

Light-off behavior of the fresh catalysts in rich exhaust gas (lambda = 0.98) (synthetic gas test)

| Example | Light-off temperature (°C.) for 50% conversion | | |
|---|---|---|---|
| | $CO_{50}$ | $HC_{50}$ | $NO_{50}$ |
| V 1 | 215 | 287 | 217 |
| B 1 | 196 | 253 | 195 |
| B 2 | 189 | 247 | 193 |
| B 3 | 194 | 256 | 191 |
| B 4 | 192 | 251 | 196 |
| V 2 | 215 | 227 | 220 |
| B 5 | 192 | 211 | 198 |
| B 6 | 189 | 208 | 191 |
| B 7 | 195 | 215 | 195 |
| B 8 | 209 | 221 | 212 |
| B 9 | 196 | 207 | 196 |
| B 10 | 214 | 229 | 219 |
| V 3 | 211 | 219 | 214 |
| B 11 | 189 | 197 | 192 |
| B 12 | 183 | 191 | 185 |
| V 4 | 218 | 235 | 225 |
| B 13 | 187 | 198 | 190 |

TABLE 4

Light-off behavior of the aged catalysts in rich exhaust gas (lambda = 0.98) (synthetic gas test)

| Example | Light-off temperature (°C.) for 50% conversion | | |
|---|---|---|---|
| | $CO_{50}$ | $HC_{50}$ | $NO_{50}$ |
| V 1 | 272 | 441 | 274 |
| B 1 | 255 | 407 | 258 |
| B 2 | 251 | 417 | 255 |
| B 3 | 248 | 412 | 252 |
| B 4 | 257 | 421 | 256 |
| V 2 | 239 | 375 | 257 |
| B 5 | 204 | 327 | 217 |
| B 6 | 211 | 332 | 221 |
| B 7 | 201 | 325 | 213 |
| B 8 | 240 | 371 | 249 |
| B 9 | 209 | 341 | 233 |
| B 10 | 235 | 369 | 252 |
| V 3 | 245 | 381 | 260 |
| B 11 | 212 | 333 | 218 |
| B 12 | 205 | 326 | 208 |

TABLE 4-continued

Light-off behavior of the aged catalysts in rich exhaust gas (lambda = 0.98) (synthetic gas test)

| Example | Light-off temperature (°C.) for 50% conversion | | |
|---|---|---|---|
| | $CO_{50}$ | $HC_{50}$ | $NO_{50}$ |
| V 4 | 250 | 397 | 257 |
| B 13 | 215 | 359 | 219 |

TABLE 5

Light-off behavior of the fresh catalysts in lean exhaust gas (lambda = 1.01) (synthetic gas test)

| Example | Light-off temperature (°C.) for 50% conversion | | |
|---|---|---|---|
| | $CO_{50}$ | $HC_{50}$ | $NO_{50}$ |
| V 1 | 199 | 230 | (not achieved) |
| B 1 | 173 | 207 | — |
| B 2 | 170 | 201 | — |
| B 3 | 178 | 203 | — |
| B 4 | 175 | 199 | — |
| V 2 | 205 | 211 | — |
| B 5 | 185 | 193 | — |
| B 6 | 182 | 189 | — |
| B 7 | 184 | 188 | — |
| B 8 | 200 | 209 | — |
| B 9 | 183 | 190 | — |
| B 10 | 208 | 213 | — |
| V 3 | 197 | 206 | — |
| B 11 | 171 | 185 | — |
| B 12 | 168 | 179 | — |
| V 4 | 212 | 219 | — |
| B 13 | 178 | 190 | — |

TABLE 6

Light-off behavior of the aged catalysts in lean exhaust gas (lambda = 1.01) (synthetic gas test)

| Example | Light-off temperature (°C.) for 50% conversion | | |
|---|---|---|---|
| | $CO_{50}$ | $HC_{50}$ | $NO_{50}$ |
| V 1 | 263 | 359 | (not achieved) |
| B 1 | 245 | 327 | — |
| B 2 | 240 | 313 | — |
| B 3 | 247 | 309 | — |
| B 4 | 248 | 312 | — |
| V 2 | 231 | 236 | — |
| B 5 | 192 | 198 | — |
| B 6 | 198 | 207 | — |
| B 7 | 190 | 196 | — |
| B 8 | 228 | 233 | — |
| B 9 | 199 | 210 | — |
| B 10 | 233 | 240 | — |
| V 3 | 227 | 243 | — |
| B 11 | 195 | 200 | — |
| B 12 | 189 | 194 | — |
| V 4 | 240 | 257 | — |
| B 13 | 208 | 223 | — |

TABLE 7

Dynamic conversion behavior of the fresh catalysts (synthetic gas test)

| | % Conversion | | | | | | | | | | | | | | | | | |
|---|---|---|---|---|---|---|---|---|---|---|---|---|---|---|---|---|---|---|
| | Lambda = 0.97 | | | Lambda = 0.98 | | | Lambda = 0.99 | | | Lambda = 1.00 | | | Lambda = 1.01 | | | Lambda = 1.02 | | |
| Example | CO | HC | NO | CO | HC | NO | CO | HC | NO | CO | HC | NO | CO | HC | NO | CO | HC | NO |
| V 1 | 49 | 88 | 97 | 57 | 90 | 98 | 68 | 92 | 93 | 88 | 94 | 90 | 91 | 94 | 52 | 93 | 94 | 41 |
| B 1 | 57 | 93 | 99 | 68 | 95 | 99 | 79 | 98 | 99 | 91 | 99 | 95 | 99 | 99 | 60 | 99 | 99 | 50 |
| B 2 | 59 | 94 | 99 | 70 | 94 | 99 | 81 | 97 | 99 | 93 | 100 | 97 | 100 | 99 | 62 | 99 | 99 | 52 |
| B 3 | 55 | 96 | 99 | 67 | 96 | 99 | 79 | 99 | 99 | 91 | 100 | 97 | 99 | 100 | 59 | 99 | 100 | 49 |
| B 4 | 57 | 93 | 99 | 69 | 93 | 99 | 79 | 97 | 98 | 92 | 99 | 96 | 100 | 99 | 61 | 100 | 99 | 52 |
| V 2 | 57 | 94 | 99 | 66 | 95 | 99 | 74 | 98 | 98 | 93 | 99 | 96 | 97 | 99 | 63 | 97 | 98 | 56 |
| B 5 | 65 | 98 | 99 | 78 | 98 | 100 | 82 | 99 | 100 | 98 | 99 | 99 | 100 | 99 | 73 | 99 | 99 | 62 |
| B 6 | 69 | 99 | 100 | 79 | 99 | 100 | 86 | 99 | 100 | 99 | 99 | 99 | 100 | 100 | 74 | 100 | 100 | 63 |

TABLE 7-continued

Dynamic conversion behavior of the fresh catalysts (synthetic gas test)

% Conversion

| Example | Lambda = 0.97 | | | Lambda = 0.98 | | | Lambda = 0.99 | | | Lambda = 1.00 | | | Lambda = 1.01 | | | Lambda = 1.02 | | |
|---|---|---|---|---|---|---|---|---|---|---|---|---|---|---|---|---|---|---|
| | CO | HC | NO | CO | HC | NO | CO | HC | NO | CO | HC | NO | CO | HC | NO | CO | HC | NO |
| B 7 | 63 | 98 | 100 | 79 | 99 | 100 | 85 | 99 | 100 | 99 | 99 | 99 | 100 | 100 | 71 | 100 | 100 | 61 |
| B 8 | 59 | 96 | 99 | 68 | 98 | 99 | 77 | 99 | 99 | 95 | 99 | 98 | 99 | 99 | 68 | 99 | 99 | 59 |
| B 9 | 68 | 98 | 100 | 81 | 99 | 100 | 87 | 99 | 99 | 99 | 99 | 99 | 100 | 100 | 71 | 99 | 99 | 62 |
| B 10 | 58 | 94 | 99 | 66 | 95 | 99 | 74 | 97 | 99 | 94 | 99 | 97 | 98 | 99 | 65 | 98 | 99 | 58 |
| V 3 | 53 | 91 | 99 | 64 | 94 | 99 | 74 | 98 | 99 | 95 | 99 | 97 | 99 | 99 | 66 | 99 | 99 | 53 |
| B 11 | 67 | 98 | 99 | 75 | 98 | 99 | 85 | 99 | 99 | 99 | 99 | 99 | 100 | 100 | 71 | 99 | 99 | 65 |
| B 12 | 69 | 99 | 99 | 78 | 99 | 99 | 87 | 100 | 99 | 99 | 100 | 99 | 100 | 100 | 72 | 99 | 100 | 61 |
| V 4 | 49 | 92 | 99 | 60 | 93 | 99 | 71 | 96 | 99 | 92 | 99 | 98 | 99 | 99 | 63 | 99 | 99 | 49 |
| B 13 | 58 | 98 | 99 | 72 | 98 | 99 | 79 | 99 | 99 | 98 | 100 | 99 | 100 | 100 | 70 | 100 | 100 | 59 |

TABLE 8

Dynamic conversion behavior of the fresh catalysts (synthetic gas test)

% Conversion

| Example | Lambda = 0.97 | | | Lambda = 0.98 | | | Lambda = 0.99 | | | Lambda = 1.00 | | | Lambda = 1.01 | | | Lambda = 1.02 | | |
|---|---|---|---|---|---|---|---|---|---|---|---|---|---|---|---|---|---|---|
| | CO | HC | NO | CO | HC | NO | CO | HC | NO | CO | HC | NO | CO | HC | NO | CO | HC | NO |
| V 1 | 27 | 48 | 68 | 43 | 52 | 66 | 60 | 64 | 66 | 71 | 72 | 57 | 77 | 82 | 52 | 82 | 89 | 45 |
| B 1 | 38 | 62 | 73 | 57 | 69 | 73 | 71 | 79 | 74 | 81 | 88 | 64 | 87 | 91 | 59 | 93 | 97 | 51 |
| B 2 | 41 | 62 | 78 | 60 | 64 | 71 | 74 | 76 | 73 | 85 | 85 | 68 | 90 | 88 | 61 | 95 | 95 | 51 |
| B 3 | 36 | 65 | 75 | 54 | 66 | 73 | 73 | 78 | 73 | 83 | 87 | 66 | 89 | 91 | 60 | 95 | 97 | 50 |
| B 4 | 39 | 60 | 75 | 58 | 66 | 72 | 73 | 78 | 73 | 80 | 83 | 67 | 89 | 89 | 59 | 94 | 95 | 51 |
| V 2 | 43 | 86 | 94 | 54 | 91 | 90 | 63 | 94 | 83 | 73 | 95 | 70 | 74 | 96 | 57 | 73 | 96 | 47 |
| B 5 | 54 | 91 | 99 | 66 | 95 | 99 | 75 | 98 | 95 | 89 | 99 | 85 | 91 | 99 | 65 | 90 | 99 | 59 |
| B 6 | 56 | 95 | 99 | 69 | 97 | 99 | 78 | 99 | 93 | 90 | 99 | 89 | 91 | 99 | 68 | 91 | 99 | 59 |
| B 7 | 53 | 93 | 99 | 69 | 97 | 99 | 76 | 99 | 94 | 87 | 99 | 83 | 89 | 99 | 63 | 89 | 99 | 56 |
| B 8 | 48 | 88 | 95 | 56 | 92 | 94 | 64 | 95 | 86 | 76 | 95 | 72 | 76 | 97 | 55 | 75 | 96 | 49 |
| B 9 | 51 | 92 | 99 | 69 | 96 | 99 | 75 | 99 | 93 | 87 | 99 | 83 | 89 | 99 | 64 | 89 | 99 | 58 |
| B 10 | 45 | 83 | 95 | 54 | 90 | 93 | 62 | 92 | 85 | 74 | 94 | 74 | 74 | 95 | 56 | 74 | 96 | 47 |
| V 3 | 39 | 74 | 81 | 51 | 80 | 82 | 62 | 84 | 78 | 75 | 88 | 68 | 77 | 89 | 54 | 79 | 90 | 49 |
| B 11 | 44 | 86 | 94 | 63 | 88 | 94 | 70 | 91 | 91 | 86 | 97 | 75 | 89 | 98 | 59 | 92 | 98 | 55 |
| B 12 | 47 | 89 | 96 | 65 | 91 | 97 | 73 | 95 | 93 | 88 | 98 | 78 | 92 | 98 | 61 | 92 | 98 | 58 |
| V 4 | 41 | 79 | 85 | 53 | 84 | 85 | 63 | 85 | 80 | 77 | 86 | 70 | 79 | 90 | 52 | 80 | 91 | 48 |
| B 13 | 49 | 88 | 93 | 59 | 90 | 95 | 72 | 92 | 92 | 88 | 98 | 80 | 91 | 98 | 60 | 91 | 98 | 56 |

TABLE 9

Light-off behavior of the fresh catalysts in rich exhaust gas (lambda = 0.984) (engine test)

| | Light-off temperature (°C.) for 50% conversion | | |
|---|---|---|---|
| Example | CO$_{50}$ | HC$_{50}$ | NO$_{50}$ |
| V 5 | 319 | 351 | 313 |
| B 14 | 295 | 333 | 284 |
| V 6 | 310 | 344 | 305 |
| B 15 | 288 | 337 | 278 |
| B 16 | 283 | 321 | 275 |

TABLE 10

Light-off behavior of the aged catalysts in rich exhaust gas (lambda = 0.984) (engine test)

| | Light-off temperature (°C.) for 50% conversion | | |
|---|---|---|---|
| Example | CO$_{50}$ | HC$_{50}$ | NO$_{50}$ |
| V 5 | 364 | 376 | 353 |
| B 14 | 335 | 342 | 320 |
| V 6 | 353 | 361 | 338 |
| B 15 | 324 | 337 | 305 |
| B 16 | 319 | 332 | 303 |

TABLE 11

Light-off behavior of the fresh catalysts in lean exhaust gas (lambda = 1.02) (engine test)

| | Light-off temperature (°C.) for 50% conversion | |
|---|---|---|
| Example | CO$_{50}$ | HC$_{50}$ |
| V 5 | 321 | 344 |
| B 14 | 289 | 300 |

TABLE 11-continued

Light-off behavior of the fresh catalysts in lean exhaust gas (lambda = 1.02) (engine test)

| | Light-off temperature (°C.) for 50% conversion | |
|---|---|---|
| Example | CO$_{50}$ | HC$_{50}$ |
| V 6 | 309 | 316 |
| B 15 | 278 | 283 |
| B 16 | 271 | 279 |
| V 7 | 342 | 345 |
| B 17 | 319 | 323 |
| B 18 | 325 | 327 |

TABLE 12

Light-off behavior of the aged catalysts in lean exhaust gas (lambda = 1.02) (engine test)

| | Light-off temperature (°C.) for 50% conversion | |
|---|---|---|
| Example | CO$_{50}$ | HC$_{50}$ |
| V 5 | 335 | 359 |
| B 14 | 311 | 317 |
| V 6 | 342 | 349 |
| B 15 | 321 | 329 |
| B 16 | 315 | 324 |
| V 7 | >450° C. | >450° C. |
| B 17 | >450° C. | >450° C. |
| B 18 | >450° C. | >450° C. |

TABLE 13

Dynamic conversion behavior of the fresh catalysts (engine test)

| Example | Lambda = 0.965 CO | HC | NO$_x$ | Lambda = 0.995 CO | HC | NO$_x$ | Lambda = 1.008 CO | HC | NO$_x$ |
|---|---|---|---|---|---|---|---|---|---|
| V 5  | 62 | 36 | 98  | 93 | 81 | 99  | 99  | 92 | 65 |
| B 14 | 69 | 42 | 100 | 98 | 87 | 99  | 100 | 94 | 70 |
| V 6  | 76 | 35 | 99  | 96 | 82 | 99  | 100 | 92 | 64 |
| B 15 | 84 | 40 | 100 | 98 | 86 | 100 | 99  | 95 | 69 |
| B 16 | 82 | 45 | 100 | 98 | 88 | 100 | 100 | 97 | 68 |
| V 7  | 51 | 40 | 93  | 94 | 91 | 94  | 98  | 93 | 63 |
| B 17 | 55 | 44 | 95  | 95 | 94 | 95  | 98  | 94 | 65 |
| B 18 | 54 | 43 | 95  | 95 | 94 | 94  | 98  | 94 | 65 |

TABLE 14

Dynamic conversion behavior of the aged catalysts (engine test)

| Example | Lambda = 0.965 CO | HC | NO$_x$ | Lambda = 0.995 CO | HC | NO$_x$ | Lambda = 1.008 CO | HC | NO$_x$ |
|---|---|---|---|---|---|---|---|---|---|
| V 5  | 52 | 58 | 94 | 91 | 90 | 91 | 98  | 91 | 60 |
| B 14 | 59 | 67 | 95 | 99 | 93 | 94 | 100 | 94 | 67 |
| V 6  | 53 | 55 | 93 | 92 | 93 | 90 | 99  | 92 | 59 |
| B 15 | 58 | 63 | 95 | 99 | 96 | 95 | 99  | 95 | 63 |
| B 16 | 57 | 64 | 95 | 99 | 98 | 97 | 99  | 96 | 63 |
| V 7  | 43 | 53 | 72 | 65 | 77 | 59 | 76  | 84 | 51 |
| B 17 | 44 | 55 | 76 | 68 | 80 | 61 | 77  | 84 | 53 |
| B 18 | 46 | 55 | 75 | 68 | 79 | 62 | 77  | 84 | 54 |

Further variations and modifications of the invention will become apparent to those skilled in the art from the foregoing and are intended to be encompassed by the claims appended hereto.

What is claimed:

1. A catalyst for purifying the exhaust gases of internal combustion engines, comprising:
   aluminum oxide of the transition series as carrier,
   3-70% by weight CeO$_2$, 0-20% by weight La$_2$O$_3$, 1-20% by weight ZrO$_2$, 0-10% by weight Fe$_2$O$_3$, and 0-20 % by weight NiO as promoter,
   and with a catalytically active phase applied to said carrier, said active phase comprising 0.02-3 % by weight of at least one member selected from the group consisting of platinum, palladium, and rhodium, wherein said catalyst contains at least one base metal from the group consisting of lithium, potassium, rubidium, magnesium, calcium, barium, lanthanum, cerium, praseodymium, neodymium, samarium, and iron, in an amount of up to 5 times the total mass of the noble metal,
   said catalyst being made by a method comprising impregnating said carrier with a solution of said promoter compound, or coating said carrier by means of mixing with a suspension of an oxide, hydroxide or carbonate of said promoter, or impregnating with a solution of said promoter compound and coating by mixing with a suspension of an oxide, hydroxide or carbonate of said promoter, subsequently treating said carrier in air at 300°-900° C. and then impregnating with a solution of compounds of the noble metals, drying and activating the impregnated carrier obtained thereby, at a temperature in a range of 250°-1050° C., whereby said catalyst contains at least one base metal from the group consisting of lithium, potassium, rubidium, magnesium, calcium, barium, lanthanum, cerium, praseodymium, neodymium, samarium, and iron, in an amount of up to 5 times the total mass of the noble metal and is obtained by impregnating the promoter-containing carrier with a solution (A) of compounds of platinum, palladium or platinum and palladium in an amount corresponding to at least 30% of the total mass of platinum, palladium or platinum and palladium, drying and activating, whereby a large part of said platinum, palladium, or platinum and palladium remains removed from the vicinity of said base metals, then impregnating with a solution (B) which contains a compound of rhodium and optionally the residual amount of platinum, palladium or platinum and palladium, drying and activating, wherein said solution (B) contains one or more base-metal compounds.

2. The catalyst according to claim 1 which further comprises forming said catalyst, as a coating on an inert carrier comprising ceramic or metal, in an amount of 5-30% by weight relative to the weight of the inert carrier.

3. The catalyst according to claim 1, wherein said La$_2$O$_3$ is present in a mixture with other rare-earth metal oxides.

4. The catalyst according to claim 1, wherein the weight ratio of platinum or palladium, or platinum and palladium to rhodium is 1:2 to 15:1.

5. The catalyst according to claim 4, wherein the weight ratio of platinum or palladium, or platinum and palladium to rhodium is 1:1 to 3:1.

6. The catalyst according to claim 1, wherein the weight ratio between platinum and palladium is 10:1 to 1:5.

7. The catalyst according to claim 1, wherein said activating is in a hydrogen-containing gas.

8. The catalyst according to claim 1, wherein said activating is under hydrothermal conditions.

9. The catalyst according to claim 1, wherein said catalyst is a honeycomb catalyst or a bulk-material shell catalyst with an inert carrier core wherein 30-100% of the total mass of said aluminum oxide carrier containing the promoters is deposited before the application of said solution (A) and 0-70% of this total mass is deposited before the application of said solution (B) as coating.

10. The catalyst according to claim 9, wherein in the case of a partial deposition of said carrier, the promoters in the partial masses of the carrier exhibit differing concentrations.

11. The catalyst according to claim 9, wherein the partial mass deposited before the application of solution (B) exhibits lower concentrations of the promoters used within the framework of the given concentration ranges than does the residual mass.

12. The catalyst according to claim 9, wherein the promoter CeO$_2$ is added into the said carrier mass present before the application of solution (A) in the form of a water-soluble compound and the specified promoter is added into the carrier mass present before the application of solution (B) by means of mixing it with a suspension of an oxide, hydroxide or carbonate of cerium.

13. The catalyst according to claim 1, wherein said CeO$_2$ is present in 3-20% by weight.

14. The catalyst according to claim 13, wherein said CeO$_2$ is present in 4-10% by weight.

15. The catalyst according to claim 1, wherein said CeO$_2$ is present in at least 15% by weight on inert honeycomb supports.

16. The catalyst according to claim 1, wherein at least 30% of the total mass of platinum, palladium, or platinum and palladium is provided in solution (A).

17. A method for making a catalyst for purifying the exhaust gases of internal combustion engines, comprising:
(a) providing aluminum oxide of the transition series as a carrier,
(b) adding to said aluminum oxide as promoter for catalysis 3-70% by weight $CeO_2$, 0-20% by weight $La_2O_3$, 1-20% by weight $ZrO_2$, 0-10% by weight $Fe_2O_3$, and 0-20% by weight NiO.
(c) subsequently treating said carrier in air at 300°-900° C.,
(d) applying to said carrier a catalytically active phase by impregnating said carrier, said active phase comprising 0.02-3% by weight of at least one member selected from the group consisting of platinum, palladium, and rhodium;
wherein said catalyst contains at least one base metal from the group consisting of lithium, potassium, rubidium, magnesium, calcium, barium, lanthanum, cerium, praseodymium, neodymium, samarium, and iron, in an amount of up to 5 times the total mass of the noble metal and is introduced by impregnating the promoter-containing carrier with a solution (A) of compounds of platinum, palladium or platinum and palladium in an amount corresponding to at least 30% of the total mass of platinum, palladium or platinum and palladium, drying and activating, then impregnating with a solution (B) which contains the compound of rhodium and optionally the residual amount of platinum, palladium or platinum and palladium, drying and activating wherein said solution (B) contains one or more base-metal compounds.

18. The method according to claim 17, wherein step (b) comprises impregnating with a solution of a promoter compound.

19. The method according to claim 17, wherein step (b) comprises coating said carrier by means of mixing the same with a suspension of oxides, hydroxides or carbonates of the particular promoter element.

20. The method according to claim 17, wherein step (b) comprises impregnating with a solution of a promoter compound and coating by mixing the same with a suspension of oxides, hydroxides or carbonates of the particular promoter element.

21. The method according to claim 17, wherein said drying and activating is conducted at a temperature in a range of 250°-1050° C.

22. The method according to claim 17, wherein said catalyst is optionally present in the form of a coating on an inert carrier comprising ceramics or metal in an amount of 5-30% by weight relative to the weight of the inert carrier.

23. The catalyst according to claim 1, wherein said rhodium that is present is not primarily present in an alloyed or interlocked state with said platinum, palladium, or platinum and palladium.

24. A catalyst for purifying the exhaust gases of internal combustion engines, consisting essentially of:
aluminum oxide of the transition series as carrier,
3-70% by weight $CeO_2$, 0-20% by weight $La_2O_3$, 1-20% by weight $ZrO_2$, 0-10% by weight $Fe_2O_3$, and 0-20% by weight NiO as promoter,
and with a catalytically active phase applied to said carrier, said active phase comprising 0.02-3% by weight of at least one member selected from the group consisting of platinum, palladium, and rhodium, wherein said carrier is optionally lattice-stabilized, and wherein said catalyst contains at least one base metal from the group consisting of lithium, potassium, rubidium, magnesium, calcium, barium, lanthanum, cerium, praseodymium, neodymium, samarium, and iron, in an amount of up to 5 times the total mass of the noble metal,
said catalyst being made by a method comprising impregnating said carrier with a solution of said promoter compound, or coating said carrier by means of mixing with a suspension of an oxide, hydroxide or carbonate of said promoter, or impregnating with a solution of said promoter compound and coating by mixing with a suspension of an oxide, hydroxide or carbonate of said promoter, subsequently treating said carrier in air at 300°-900° C. and then impregnating with a solution of compounds of the noble metals, drying and activating the impregnated carrier obtained thereby, at a temperature in a range of 250°-1050° C., whereby said catalyst contains at least one base metal from the group consisting of lithium, potassium, rubidium, magnesium, calcium, barium, lanthanum, cerium, praseodymium, neodymium, samarium, and iron, in an amount of up to 5 times the total mass of the noble metal and is obtained by impregnating the promoter-containing carrier with a solution (A) of compounds of platinum, palladium or platinum and palladium in an amount corresponding to at least 30% of the total mass of platinum, palladium or platinum and palladium, drying and activating, whereby a large part of said platinum, palladium, or platinum and palladium remains removed from the vicinity of said base metals, then impregnating with a solution (B) which contains a compound of rhodium and optionally the residual amount of platinum, palladium or platinum and palladium, drying and activating, wherein said solution (B) contains one or more base-metal compounds.

* * * * *